(12) United States Patent
Magyar

(10) Patent No.: US 6,601,920 B1
(45) Date of Patent: Aug. 5, 2003

(54) LINEAR RECLINER ASSEMBLY

(75) Inventor: Joseph J. Magyar, Fenton, MI (US)

(73) Assignee: Magna Seating Systems Inc., Aurora (CA)

(*) Notice: Subject to any disclaimer, the term of this patent is extended or adjusted under 35 U.S.C. 154(b) by 0 days.

(21) Appl. No.: 09/856,386

(22) PCT Filed: Nov. 18, 1999

(86) PCT No.: PCT/CA99/01103
§ 371 (c)(1),
(2), (4) Date: Jul. 23, 2001

(87) PCT Pub. No.: WO00/30889
PCT Pub. Date: Jun. 2, 2000

Related U.S. Application Data
(60) Provisional application No. 60/109,338, filed on Nov. 20, 1998.

(51) Int. Cl.$^7$ .................................. B60N 2/235
(52) U.S. Cl. ..................... 297/362.12; 297/375
(58) Field of Search ............... 297/362.12, 375

(56) References Cited

U.S. PATENT DOCUMENTS

| | | | |
|---|---|---|---|
| 4,801,177 A | 1/1989 | Kanazawa ................... 297/367 |
| 4,898,424 A | 2/1990 | Bell ........................ 297/375 X |
| 5,299,853 A | * 4/1994 | Griseold et al. ........ 297/362.12 |
| 5,421,640 A | 6/1995 | Bauer et al. ................. 297/372 |
| 5,558,402 A | 9/1996 | Yamada ................... 297/367 X |
| 5,618,083 A | 4/1997 | Martone et al. ............. 297/375 |
| 5,634,534 A | 6/1997 | Kanai et al. .................. 188/67 |
| 5,660,440 A | * 8/1997 | Pejathaya ............... 297/362.12 |
| 5,718,482 A | 2/1998 | Robinson ........... 297/362.12 X |
| 5,718,483 A | 2/1998 | Yamaguchi et al. ........ 297/367 |
| 5,727,847 A | 3/1998 | Martone et al. ............. 297/375 |
| 5,769,493 A | 6/1998 | Pejathaya ............... 297/362.12 |
| 5,772,283 A | 6/1998 | Yoshida et al. |
| 5,775,776 A | 7/1998 | Schooler et al. ............. 297/375 |
| 5,823,622 A | * 10/1998 | Fisher, IV et al. .. 297/362.12 X |
| 5,871,259 A | 2/1999 | Gehart ................... 297/362.12 |
| 5,918,939 A | * 7/1999 | Magadanz ............... 297/375 X |
| 5,947,560 A | * 9/1999 | Chen ..................... 297/362.12 |
| 5,984,412 A | * 11/1999 | Magyar ................. 297/362.12 |
| 5,997,089 A | * 12/1999 | Kawasaki .......... 297/362.12 X |
| 6,017,090 A | * 1/2000 | Bonk .................... 297/362.12 |
| 6,279,995 B1 | * 8/2001 | Nakamura et al. ..... 297/362.12 |
| 6,315,361 B1 | * 11/2001 | Stone et al. ........ 297/362.12 X |

FOREIGN PATENT DOCUMENTS

EP           0 628 448 A1    5/1994

* cited by examiner

Primary Examiner—Rodney B. White
(74) Attorney, Agent, or Firm—Clark Hill PLC

(57) ABSTRACT

An assembly for adjusting the angular position of a seat back member (18) relative to a seat cushion member (12) having an anchor shaft (34) supported by a bracket (36) that is attached to the seat cushion member (12) and supports a pawl plate (32) transmitting forces thereto from a rod (24) when in a latched position. The anchor shaft (34) extends through the slot (42) to prevent longitudinal movement of the pawl plate (32) while allowing the pawl plate (32) to rotate about an axis parallel to the longitudinal axis (A) of the rod (24). A pair of guide plates (44) guide the pawl plate (32) to move in an arc transversely into and out of engagement with the rod (24) between the latched and unlatched positions. An actuator pin (56) extends laterally from the pawl plate (32) and a lever (58) is supported on an axle (60), which is supported for rotation by the housing (38). The lever (58) includes a slot (62) surrounding the pin (56) for moving the pin (56) in an arc to rotate the pawl plate (32) between the latched and unlatched positions. The housing (38) is supported on the anchor (34) for guiding movement of the pawl plate (32) between the latched and unlatched positions.

13 Claims, 4 Drawing Sheets

LINEAR RECLINER ASSEMBLY

This application claims the benefit of Provisional Application No. 60/109,338, filed Nov. 20, 1998.

FIELD OF THE INVENTION

The subject invention relates to an assembly for adjusting the angular position of a seat back member relative to a seat cushion member, particularly for an automotive seat assembly.

DESCRIPTION OF THE PRIOR ART

The movement of a seat back in an automotive seat assembly to a forwardly folded rear entry position and/or to a reclining position is controlled by a mechanism, which is actuated by the operator. Such mechanisms typically include a rod extending along a longitudinal axis between a first end and a second end for connection to one of the back and cushion members. A pawl engages the rod in a latched position to prevent movement of the rod relative to the pawl and is moveable to an unlatched position to allow movement of the rod longitudinally relative to the pawl to adjust the angular position of the seat back member. Examples of such mechanisms are disclosed in U.S. Pat. No. 4,801,177 to Kanazawa, U.S. Pat. No. 4,898,424 to Bell, U.S. Pat. No. 5,421,640 to Bauer et al, U.S. Pat. No. 5,558,402 to Yamada, U.S. Pat. No. 5,718,482 to Robinson, U.S. Pat. No. 5,718,483 to Yamaguchi et al, U.S. Pat. No. 5,769,493 to Pejathaya, U.S. Pat. No. 5,772,283 to Yoshida et al, and U.S. Pat No. 5,871,259 to Gehart. In some of these mechanisms, the rod is defined by a circular or arcuate sector.

In these prior art mechanisms, the pawl is moved into and out of engagement with the rod generally in the plane of the rod, i.e., the pawl rotates about an axis that is perpendicular to the plane in which the rod moves. In such an arrangement, the pawl is either supported directly on one of the seat members or on a housing that is, in turn, attached directly to the seat member, but in either case is limited in movement to a single plane.

SUMMARY OF THE INVENTION

Accordingly, it is an object of the subject invention to provide such a mechanism wherein the forces are transmitted directly from the pawl to one of the seat members, but wherein the pawl is independently supported and guided for latching and unlatching movement.

The invention, therefore, includes an assembly for adjusting the angular position of a seat back member relative to a seat cushion member. The assembly comprises a rod extending along a longitudinal axis between a first end and a second end for connection to one of the back and cushion members and a pawl for engaging the rod in a latched position to prevent movement of the rod relative to the pawl and moveable to an unlatched position to allow movement of the rod longitudinally relative to the pawl. The assembly is characterized by an anchor for interconnecting the pawl and the other of the back and cushion members for transmitting forces thereto from the rod in the latched position and for allowing the pawl to move to the unlatched position. A housing is supported on the anchor for guiding movement of the pawl between the latched and unlatched positions while remaining substantially free of stresses transmitted through the pawl plate and the rod.

As will be appreciated, by transmitting forces directly from the pawl to one of the seat members, the housing which guides the movement of the pawl need not respond to such loads.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
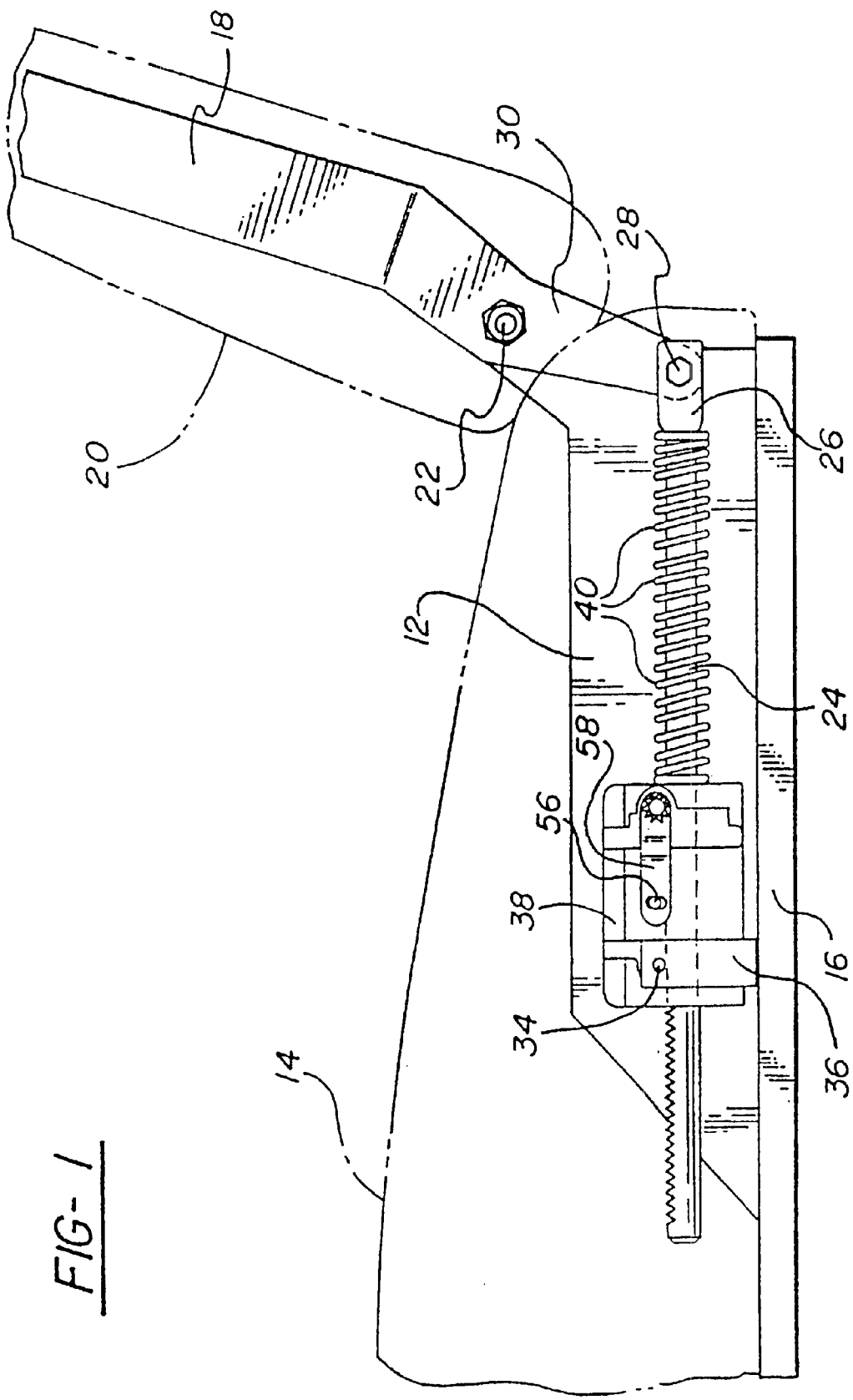
FIG. 1 is a side elevational view of a seat assembly incorporating the subject invention.

Referring to the Figures, wherein like numerals indicate like or corresponding parts throughout the several views, a seat assembly utilizing the subject invention is shown in FIG. 1. A seat cushion member 12 supports a foam cushion 14 and is supported on a seat track 16, as is well known in the art. A seat back member 18 supports the back cushion 20. A pivot 22 supports the back member 18 on the cushion member 12 for pivotal movement relative to the cushion member 12, typically reclining movement or forward folding movement for rear entry in a two-door vehicle.

A rod 24 extends along a longitudinal axis A between a first end and a second end connected to one of the members 12 and 18. More specifically, the rod 24 has a flattened first end 26 attached by a bolt 28 to the lower end of an arm 30 of the back member 18 that extends below the pivot 22. Although the rod 24 is illustrated as straight, it should be appreciated that the longitudinal axis A of the rod 24 could be curved to extend in an arc, an arc which could be struck about the pivot 22 as the center.

A pawl, which comprises an elongated pawl plate 32 having a top edge and a bottom edge, engages the rod 24 in a latched position to prevent movement of the rod 24 relative to the pawl plate 32 and moveable to an unlatched position to allow movement of the rod 24 longitudinally relative to the pawl plate 32. The rod 24 and the pawl plate 32 include interlocking teeth 33 that mesh in the latched position which is shown in full lines, the unlatched position being shown in phantom in FIGS. 5 and 6.

The assembly is characterized by an anchor 34 defined by a shaft interconnecting the pawl plate 32 and the other of the members 12 and 18 for transmitting forces thereto from rod 24 in the latched position and for allowing the pawl plate 32 to move to the unlatched position. The anchor shaft 34 is supported between two brackets 36 that are attached to the seat cushion member 12. A housing 38 is supported on the anchor 34 for guiding movement of the pawl plate 32 between the latched and unlatched positions while remaining free of stresses transmitted through the pawl plate and the rod 24 between the members 12 and 18. The housing 38 is made of an organic polymeric material, i.e., plastic, and is defined by two shells of halves that snap together or are glued together. The housing 38 is lightweight and does not require structural strength. It does, however, have sufficient strength to react against a spring 40. The spring 40 reacts between the first end 26 of the rod 24 and the housing 38 to urge the back member 18 in the forward folded position, i.e., the rear entry position. If a user releases the pawl plate 32, the back member 18 will be moved forwardly by the spring 40 and the user can adjust the back member 18 by pushing it rearwardly to the desired position.

A connection, comprising an elongated or an oval shaped slot 42, connects the pawl plate 32 to the anchor shaft 34 for limited movement longitudinally relative to the rod 24 and movement transversely of the longitudinal axis A between the latched and unlatched positions. The anchor shaft 34 extends through the slot 42 to prevent longitudinal movement of the pawl plate 32 while allowing the pawl plate 32 to rotate about an axis parallel to the longitudinal axis A of the rod 24.

Figure 5:
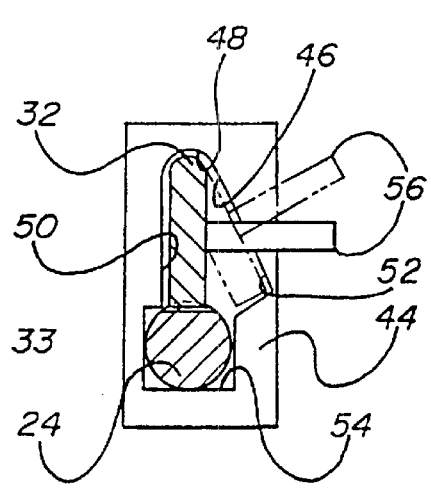
FIG. 5 is a cross sectional view taken along line 5—5 of FIG. 4.
Figure 6:
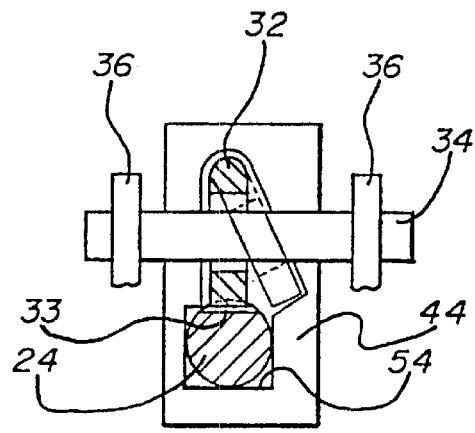
FIG. 6 is a cross sectional view taken along line 6—6 of FIG. 4.
Figure 7:
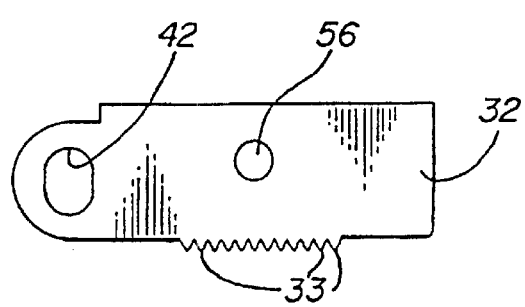
FIG. 7 is a side view of the pawl latch of the subject invention.
Figure 8:
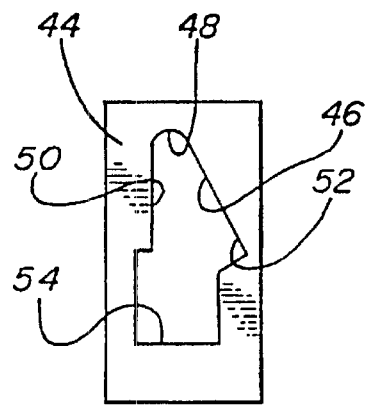
FIG. 8 is a side view of one of the guide plates of the subject invention.

The housing 38 includes guides defined by guide plates 44 for guiding the pawl plate 32 to move in an arc transversely into and out of engagement with the rod 24 between the latched and unlatched positions, as best illustrated in FIGS. 5 and 6. The guide plates 44 are disposed in parallel and spaced relationship with one another. Each of the guide plates 44 includes a triangular opening 46 having an apex 48 at the top thereof for engaging the top edge of the pawl plate 32 and diverging sides 50 and 52 for allowing the bottom edge of the pawl plate 32 to rotate about the apex 48 and out of engagement with the rod 24. The guide plates 44 also include rod openings 54 below and opening into the triangular openings 46 and the rod 24 extends through the rod openings 54.

An actuator rotates the pawl plate 32 between the latched and unlatched positions. The actuator includes a pin 56 extending laterally from the pawl plate 32 and a lever 58 supported on an axle 60, which is supported for rotation by the housing 38. The lever 58 includes a slot 62 surrounding the pin 56 for moving the pin 56 in an arc to rotate the pawl plate 32 between the latched and unlatched positions. The axle 60 is rotated by a handle 64 connected to the axle 60 by a spline 66.

Although the housing 38 is shown as surrounding or encapsulating the pawl plate 32, it should be recognized that the housing could take a wide variety of designs so long as it guides the lateral or transverse movement of the pawl plate 32.

Figure 2:
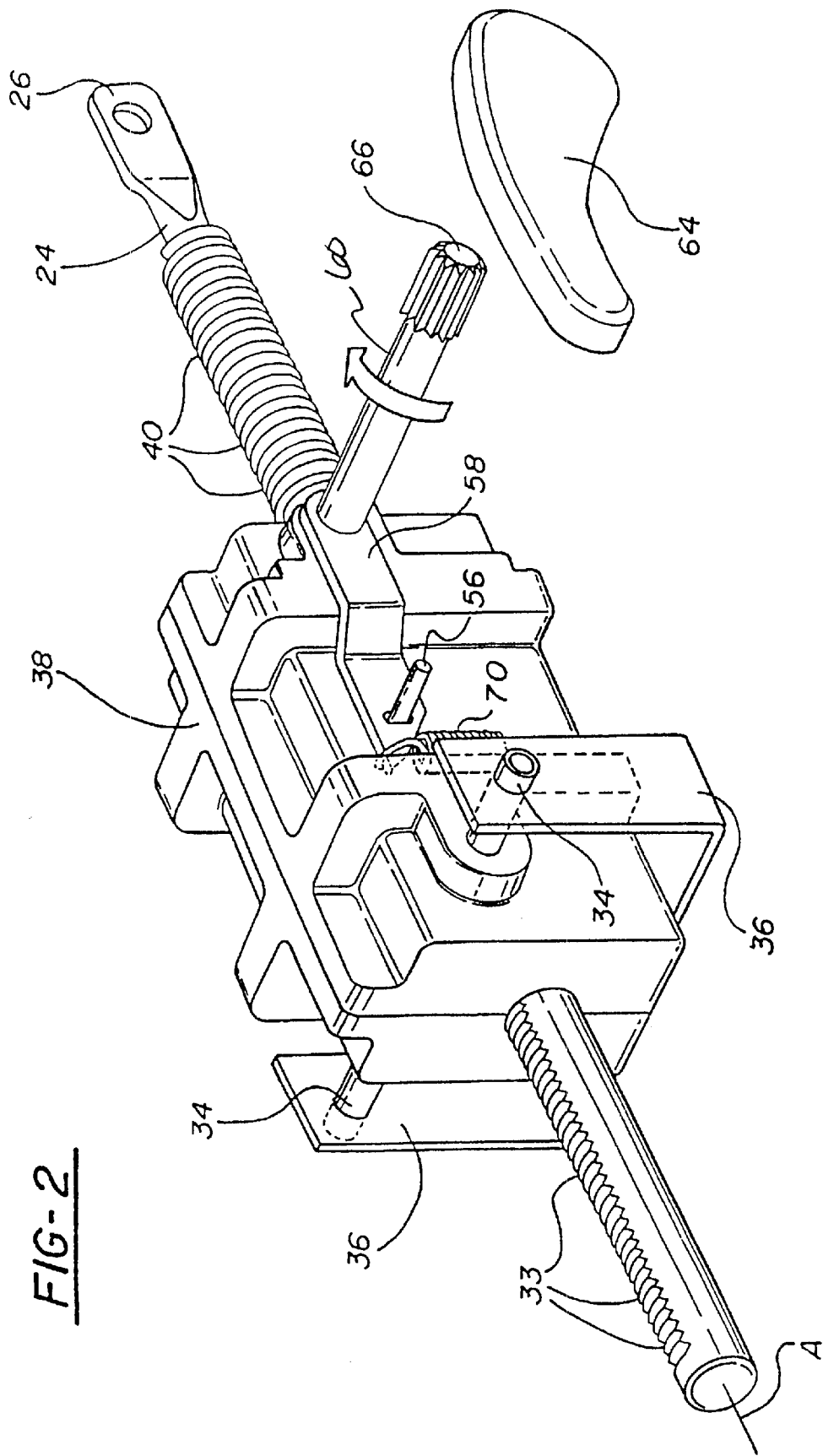
FIG. 2 is a perspective view of the subject invention.
Figure 3:
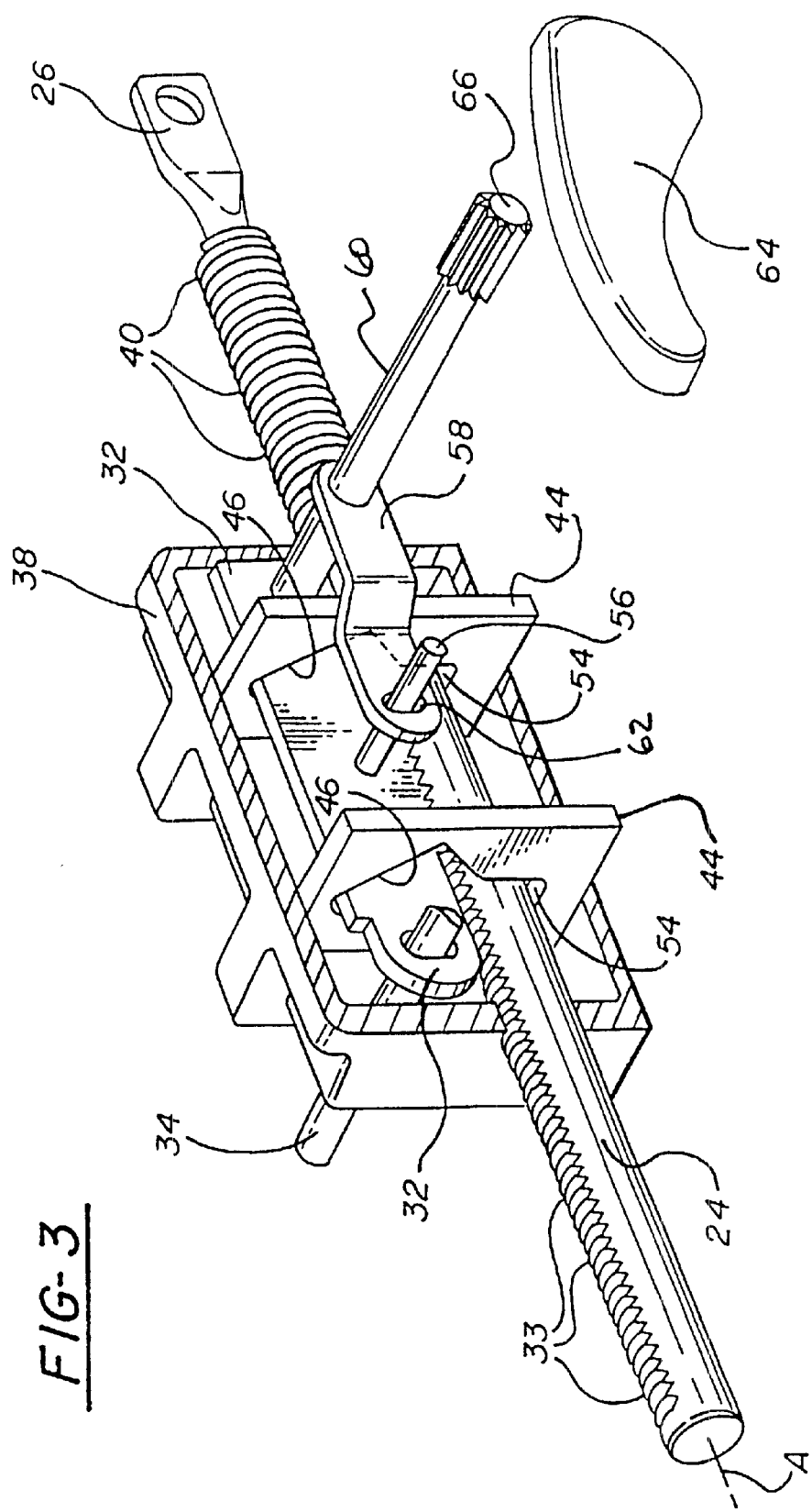
FIG. 3 is a perspective view similar to FIG. 2 but broken away to show the interior components.
Figure 4:
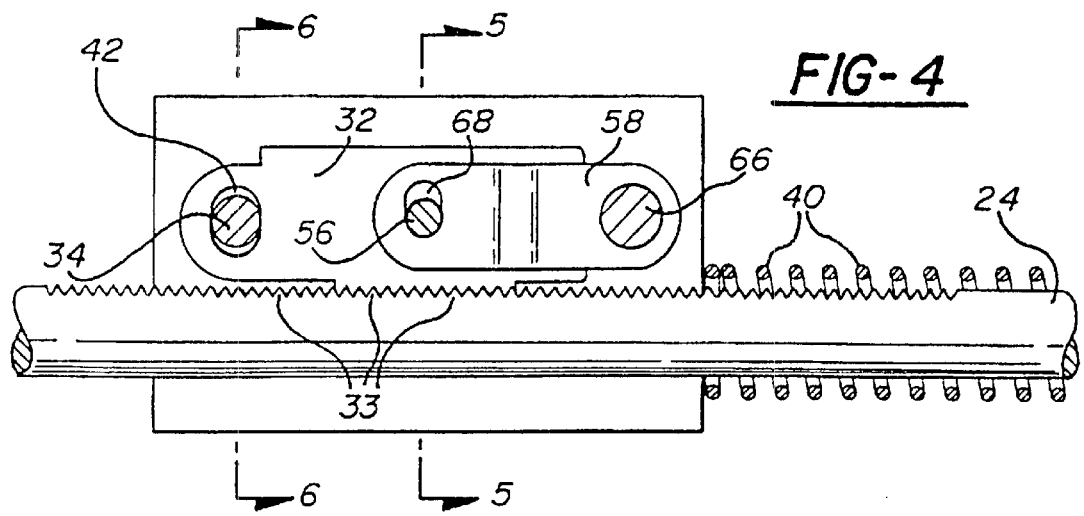
FIG. 4 is a schematic view of the subject invention.

In operation, the handle 64 is rotated clockwise as viewed in FIGS. 2 and 3 to rotate the pin 56 upwardly to rotate the pawl plate 32 about the apex 48 of the triangular openings 46 in the guide plates 44. The lever 58 includes a vertically elongated slot 68 to accommodate the relative angular orientation of the pin 56 relative to the plane of the lever 58. As the teeth 33 on the bottom edge of the pawl plate 32 are rotated laterally out of engagement with the teeth 33 on the rod 24, this unlatched position allows the rod to move longitudinally of its axis A to adjust the angular position of the back member 18 of the seat assembly. A spring 70 returns the lever to the initial or latched position upon release of the handle 64.

The invention has been described in an illustrative manner, and it is to be understood that the terminology which has been used is intended to be in the nature of words of description rather than of limitation.

Many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. An assembly for adjusting the angular position of a seat back member (18) relative to a seat cushion member (12) comprising;

a rod (24) extending along a longitudinal axis between a first end and a second end for connection to one of said back (18) and cushion (12) members, and a pawl (32) for engaging said rod (24) in a latched position to prevent movement of said rod (24) relative to said pawl (32) and moveable to an unlatched position to allow movement of said rod (24) longitudinally relative to said pawl (32), an anchor (34) for interconnecting said pawl (32) and the other of the back (18) and cushion (12) members for transmitting forces thereto from said rod (24) in said latched position and for allowing said pawl (32) to move to said unlatched position, a housing (38) supported on said anchor (34) for guiding movement of said pawl (32) between said latched and unlatched positions, a connection connecting said pawl (32) to said anchor (34) for limiting movement longitudinally relative to said rod (24) and allowing movement transversely of said longitudinal axis between said latched and unlatched positions, and a pair of guide plates (44) supported by said housing disposed in parallel and spaced relationship with one another with each of said guide plates (44) including a triangular opening (46), said opening (46) having an apex (48) at the top thereof for engaging said pawl (32) and diverging sides (50, 52) for allowing said pawl (32) to rotate about said apex (48) and move in an arc transversely into and out of engagement with said rod (24) between said latched and unlatched positions.

2. An assembly as set forth in claim 1 including an actuator for rotating said pawl (32) between said latched and unlatched positions.

3. An assembly as set forth in claim 2 wherein said pawl (32) comprises an elongated pawl plate (32) having a top edge and a bottom edge, said connection includes a slot (42) in said pawl plate (32), said anchor (34) comprises a shaft extending through said slot (42) to prevent longitudinal movement of said pawl plate (32) while allowing said pawl plate (32) to rotate about an axis parallel to said longitudinal axis of said rod (24).

4. An assembly as set forth in claim 3 wherein said guide plates (44) include rod openings (54) below and opening into said triangular openings (46) and said rod (24) extends through said rod openings (54).

5. A seat assembly comprising;

a seat cushion member (12), a seat back member (18), a pivot (22) supporting said back member (18) on said cushion member (12) for pivotal movement relative to said cushion member (12), a rod (24) extending along a longitudinal axis between first and second ends with said second end connected to one of said members (12, 18), and a pawl (32) for engaging said rod (24) in a latched position to prevent movement of said rod (24) relative to said pawl (32) and moveable to an unlatched position to allow movement of said rod (24) longitudinally relative to said pawl (32), an anchor (34) for interconnecting said pawl (32) and the other of said members (12, 18) for transmitting forces thereto from said rod (24) in said latched position and for allowing said pawl (32) to move to said unlatched position, a housing (38) supported on said anchor (34) for guiding movement of said pawl (32) between said latched and unlatched positions, a connection connecting said pawl (32) to said anchor (34) for limiting movement longitudinally relative to said rod (24) and allowing movement transversely of said longitudinal axis between said latched and unlatched positions, and a pair of guide plates (44) supported by said housing disposed in parallel and spaced relationship with one another with each of said guide plates (44) including a triangular opening (46), said opening (46) having an apex (48) at the top thereof for engaging said pawl (32) and diverging sides (50, 52) for allowing said pawl (32) to rotate about said apex (48) and move in an arc transversely into and out of engagement with said rod (24) between said latched and unlatched positions.

6. An assembly as set forth in claim 5 including an actuator for rotating said pawl (32) between said latched and unlatched positions.

7. An assembly as set forth in claim 6 wherein said pawl (32) comprises an elongated pawl plate (32) having a top edge and a bottom edge, said connection includes a slot (42) in said pawl plate (32), said anchor (34) comprises a shaft extending through said slot (42) to prevent longitudinal movement of said pawl plate (32) while allowing said pawl plate (32) to rotate about an axis parallel to said longitudinal axis of said rod (24).

8. An assembly as set forth in claim 7 wherein said guide plates (44) include rod openings (54) below and opening into said triangular openings (46) and said rod (24) extends through said rod openings (54).

9. An assembly as set forth in claim 8 wherein said actuator includes a pin (56) extending laterally from said pawl plate (32) and a lever (58) rotatably supported by said housing (38) and having a slot (62) surrounding said pin (56) for moving said pin (56) in an arc to rotate said pawl plate (32) between said latched and unlatched positions.

10. An assembly as set forth in claim 9 wherein said actuator includes an axle (60) rotatably supported by said housing (38) and supporting said lever (58).

11. An assembly as set forth in claim 10 wherein said housing (38) consists of an organic polymeric material.

12. An assembly as set forth in claim 10 wherein said rod (24) and said pawl plate (32) include interlocking teeth that mesh in said latched position.

13. An assembly as set forth in claim 10 wherein said rod (24) is attached to said back member (18) and said shaft defining said anchor (34) is attached to said cushion member (12).

\* \* \* \* \*